United States Patent
Huang et al.

(10) Patent No.: US 9,045,098 B2
(45) Date of Patent: Jun. 2, 2015

(54) VOCABULARY DICTIONARY RECOMPILE FOR IN-VEHICLE AUDIO SYSTEM

(75) Inventors: Ritchie Huang, Torrance, CA (US); Stuart M. Yamamoto, Hacienda Heights, CA (US); David M. Kirsch, Torrance, CA (US)

(73) Assignee: Honda Motor Co., Ltd., Tokyo (JP)

(*) Notice: Subject to any disclaimer, the term of this patent is extended or adjusted under 35 U.S.C. 154(b) by 687 days.

(21) Appl. No.: 12/951,019

(22) Filed: Nov. 20, 2010

(65) Prior Publication Data

US 2011/0131037 A1  Jun. 2, 2011

Related U.S. Application Data (60) Provisional application No. 61/265,569, filed on Dec. 1, 2009.

(51) Int. Cl.
| | | |
|---|---|---|
| G10L 21/00 | (2013.01) |
| B60R 16/037 | (2006.01) |
| G10L 15/065 | (2013.01) |
| G10L 15/22 | (2006.01) |
| G10L 15/187 | (2013.01) |

(52) U.S. Cl.
CPC ............ B60R 16/0373 (2013.01); G10L 15/065 (2013.01); G10L 15/187 (2013.01); G10L 15/22 (2013.01)

(58) Field of Classification Search
None
See application file for complete search history.

(56) References Cited

U.S. PATENT DOCUMENTS

| | | |
|---|---|---|
| 5,638,487 A | 6/1997 | Chigier |
| 6,094,635 A | 7/2000 | Scholz et al. |
| 6,232,539 B1 * | 5/2001 | Looney et al. ................. 84/609 |

(Continued)

FOREIGN PATENT DOCUMENTS

| | | |
|---|---|---|
| EP | 06188565 A2 | 10/1994 |
| EP | 1233407 A1 | 8/2002 |

(Continued)

OTHER PUBLICATIONS

PCT/US2010/057607, "Notification of Transmittal of the International Search Report and the Written Opinion of the International Searching Authority, or the Declaration," mailed Jan. 28, 2011, 11 pages (corresponds to present U.S. application).

(Continued)

*Primary Examiner* — Jakieda Jackson
(74) *Attorney, Agent, or Firm* — Capitol City TechLaw; Richard C. Irving (57) ABSTRACT

An in-vehicle audio system and methods are provided. A respective word or a respective phrase may be associated with each item of audio content stored in the in-vehicle audio system. The in-vehicle audio system may perform an action with respect to one of the stored items of audio content in response to a spoken command, which may include the respective word or the respective phrase associated with the one of the stored items. When audio content is to be added to the in-vehicle audio system, phonetics related to the audio content may be generated and added to a vocabulary dictionary during a compile process. When stored audio content is to be deleted from the in-vehicle audio system, phonetics related to the stored audio content to be deleted may be eliminated from the vocabulary dictionary during the compile process, which, in some embodiments, may be performed during a shutdown process.

17 Claims, 5 Drawing Sheets

(56) References Cited

U.S. PATENT DOCUMENTS

| | | | |
|---|---|---|---|
| 6,298,324 B1 | 10/2001 | Zuberec et al. | |
| 6,389,394 B1* | 5/2002 | Fanty | 704/249 |
| 6,473,734 B1 | 10/2002 | Dvorak | |
| 6,654,955 B1 | 11/2003 | Kusnitz et al. | |
| 7,100,195 B1* | 8/2006 | Underwood | 726/2 |
| 7,243,069 B2 | 7/2007 | Jaepel et al. | |
| 7,729,913 B1* | 6/2010 | Lee et al. | 704/254 |
| 8,005,668 B2* | 8/2011 | Arun | 704/226 |
| 8,094,949 B1* | 1/2012 | Rhoads | 382/232 |
| 8,244,536 B2* | 8/2012 | Arun | 704/270 |
| 2002/0007278 A1* | 1/2002 | Traynor | 704/275 |
| 2002/0048350 A1 | 4/2002 | Phillips et al. | |
| 2003/0088415 A1 | 5/2003 | Kobal et al. | |
| 2003/0118973 A1* | 6/2003 | Noble | 434/167 |
| 2003/0120493 A1* | 6/2003 | Gupta | 704/270.1 |
| 2004/0111259 A1 | 6/2004 | Miller et al. | |
| 2004/0181391 A1 | 9/2004 | Inoue et al. | |
| 2004/0193416 A1 | 9/2004 | Emonts et al. | |
| 2004/0199387 A1* | 10/2004 | Wang et al. | 704/243 |
| 2005/0080797 A1 | 4/2005 | Short | |
| 2005/0171783 A1* | 8/2005 | Suominen | 704/276 |
| 2006/0200442 A1* | 9/2006 | Parikh | 707/1 |
| 2006/0206327 A1 | 9/2006 | Hennecke et al. | |
| 2006/0230350 A1* | 10/2006 | Baluja | 715/700 |
| 2007/0005206 A1 | 1/2007 | Zhang et al. | |
| 2007/0005360 A1 | 1/2007 | Huning et al. | |
| 2007/0112569 A1* | 5/2007 | Wang et al. | 704/260 |
| 2007/0156407 A1 | 7/2007 | Schedl | |
| 2007/0156762 A1 | 7/2007 | Ben-Yaacov et al. | |
| 2007/0225970 A1 | 9/2007 | Kady et al. | |
| 2008/0140401 A1* | 6/2008 | Abrash et al. | 704/251 |
| 2008/0211641 A1* | 9/2008 | Murray et al. | 340/426.12 |
| 2009/0024392 A1 | 1/2009 | Koshinaka | |
| 2009/0076681 A1* | 3/2009 | Yasue et al. | 701/35 |
| 2009/0083314 A1* | 3/2009 | Maim | 707/103 R |
| 2009/0118265 A1* | 5/2009 | Peters et al. | 514/221 |
| 2009/0259467 A1* | 10/2009 | Sumiyoshi et al. | 704/246 |
| 2010/0031143 A1* | 2/2010 | Rao et al. | 715/261 |
| 2010/0070921 A1* | 3/2010 | Rieman et al. | 715/811 |
| 2010/0073132 A1* | 3/2010 | Dybalski et al. | 340/5.65 |
| 2010/0235831 A1* | 9/2010 | Dittmer | 718/1 |

FOREIGN PATENT DOCUMENTS

| | | |
|---|---|---|
| EP | 1300829 A1 | 4/2003 |
| EP | 1693829 A1 | 8/2006 |
| JP | 2002215186 A | 7/2002 |
| JP | 2008089825 A | 4/2008 |
| WO | 2004029931 A1 | 4/2004 |

OTHER PUBLICATIONS

"Centrafuse 2.0 User Guide", 68 pages, Flux Media, Inc., 2008.

"Centrafuse | Car PC Front-end software", retrieved from http://www.fluxmedia.net on May 1, 2009, 4 pages.

"inCar Terminal | Car-PC Shop für Auto Computer!", retrieved from http://www.incarterminal.de/ on May 1, 2009, 2 pages.

Abstract of JP2008089825, Voice Recognition Apparatus and Voice Recognition Program, published Apr. 17, 2008.

Abstract of JP2002215186, Speech Recognition System, published Jul. 31, 2002.

* cited by examiner

VOCABULARY DICTIONARY RECOMPILE FOR IN-VEHICLE AUDIO SYSTEM

This application claims priority, pursuant to 35 U.S.C. §119(e), to U.S. Provisional Application 61/265,569, filed in the U.S. Patent and Trademark Office on Dec. 1, 2009, and specifically incorporated herein, in its entirety, by reference.

BACKGROUND

1. Field of the Invention

The present teachings generally relate to methods and in-vehicle audio systems in which audio content can be added to or deleted from a storage device of the in-vehicle audio systems.

2. Discussion of Related Art

A speech recognition system uses one or more vocabulary dictionaries in order to phonetically match an utterance of a user. In some speech recognition systems such as, for example, an in-vehicle audio system, audio content, such as music or other audio content, may be added to or deleted from the in-vehicle audio system. Each item of audio content may have a word or a phrase associated therewith. The word or the phrase may be a title of an item of audio content. A user may cause the in-vehicle audio system to play an item of audio content by speaking a command, which may include the title of the item of the audio content. Thus, as items of audio content are added to and/or deleted from the in-vehicle audio system, the vocabulary dictionary of the speech recognition system will become more outdated unless the vocabulary dictionary is compiled. However, compiling the vocabulary dictionary may take some time, during which a speech recognition feature of the in-vehicle audio system may not be available to the user.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

An in-vehicle audio system is provided which permits a user to operate the in-vehicle audio system by speaking a command. The in-vehicle audio system may include a speech recognition component and a storage device including a storage medium for storing audio content. A respective word or a respective phrase may be associated with each item of stored audio content. In some embodiments the audio content may include songs or musical pieces. The in-vehicle audio system may play one of the items of the audio content in response to the user uttering a command such as, for example, "play", or other command, followed by the word or the phrase associated with the one of the items of the audio content.

Audio content may be copied or ripped from a storage medium, such as, for example, a compact disc (CD), a digital video disc (DVD) or another type of storage medium, to a medium of a storage device of the in-vehicle audio system. Further, audio content stored on the medium of the storage device may be deleted.

When audio content is to be added to the in-vehicle audio system, phonetics corresponding to words or phrases associated with the audio content to be added may be generated. The generated phonetics may be added to the vocabulary dictionary when the vocabulary dictionary is compiled, such that an utterance, including words or phrases corresponding to the generated phonetics, may be recognized by the in-vehicle audio system. In various embodiments, compiling of the vocabulary dictionary to add the generated phonetics may begin while the audio content is being added to the in-vehicle audio system and the compiling may be completed before the adding of the audio content to the in-vehicle audio system is completed.

In some embodiments, when the audio content is to be deleted from the in-vehicle audio system, the vocabulary dictionary may be updated by being compiled during a shutdown process of the in-vehicle audio system. In other embodiments, the vocabulary dictionary may be compiled shortly after determining that the audio content is to be deleted from the in-vehicle system.

BRIEF DESCRIPTION OF THE DRAWINGS

In order to describe the manner in which the above-recited and other advantages and features can be obtained, a more particular description is described below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Overview

An in-vehicle audio system may include a speech recognition component such that a user may operate the in-vehicle audio system by speaking a command. The in-vehicle audio system may include a storage device having a storage medium for storing audio content. Each item of the audio content may have a word or a phrase associated therewith. For example, in an embodiment in which the items of the audio content include songs or musical pieces, a word or a phrase associated with an item of the audio content may be a title of the item. The user may cause the in-vehicle audio system to play one of the items of the audio content by simply speaking a command such as, for example, "play", or another verbal command, and the word or the phrase associated with the item.

The in-vehicle audio system may copy or rip audio content from a storage medium such as, for example, a compact disc (CD), a digital video disc (DVD), another type of optical medium, or another type of storage medium, to a medium of a storage device of the in-vehicle audio system. Further, audio content of the medium of the storage device may be deleted to make room for storing other audio content on the medium of the storage device.

When audio content is added to the in-vehicle audio system, words or phrases associated with the audio content to be added may be determined and corresponding phonetics may be generated. The generated phonetics may be added to the vocabulary dictionary when the vocabulary dictionary is compiled, such that an utterance, including words or phrases corresponding to the generated phonetics, may later be recognized by the speech recognition component. In various embodiments, compiling of the vocabulary dictionary to add the generated phonetics may begin while the audio content is being added to the in-vehicle audio system and the compiling may be completed before the adding of the audio content to the in-vehicle audio system is completed. Therefore, the speech recognition component of the in-vehicle audio system may be capable of recognizing words or phrases associated with added audio content when the adding of the audio content to the in-vehicle audio system is completed.

In some embodiments, when audio content is to be deleted from the in-vehicle audio system, the vocabulary dictionary may be updated by being compiled during a shutdown process of the in-vehicle audio system. The shutdown process may be initiated by detection of an occurrence of a particular event such as, for example, an ignition off event or other event. Therefore, in embodiments in which compiling of the vocabulary dictionary may be time-consuming, the vocabulary dictionary may be compiled during the shutdown process, thereby making unavailability of the speech recognition feature during the compiling less noticeable to the user.

In some embodiments, the vocabulary dictionary may be organized into a number of different portions. The portions may be arranged alphabetically by a word or a phrase associated with each item of audio content, by genre of an item of audio content, or by another type of arrangement. For example, if the items of audio content include music, each of the portions of the vocabulary dictionary are arranged to correspond to respective genres of music such as, for example, classical, rock, jazz, pop, oldies, etc. As an example, phonetics corresponding to a word or a phrase associated with an item of audio content of the genre "rock" may be included in the portion of the vocabulary dictionary corresponding to the genre "rock". When adding items of "rock" audio content to the in-vehicle audio system, phonetics corresponding to words or phrases associated with each of the items of the audio content may be added to the vocabulary dictionary by compiling only the portion of the vocabulary dictionary corresponding to the genre "rock".

Similarly, when deleting one or more items of the "rock" audio content from the in-vehicle audio system, only the portion of the vocabulary dictionary corresponding to the genre "rock" may be compiled. When only one or more portions of the vocabulary dictionary are being compiled, a time for completing compiling is less than a time for compiling all of the vocabulary dictionary. In embodiments in which less than all of the vocabulary dictionary may be compiled, when one or more items of audio content are deleted from the in-vehicle audio system, the vocabulary dictionary may be compiled at approximately a time when the one or more items of audio content are deleted.

Exemplary Devices

Figure 1:
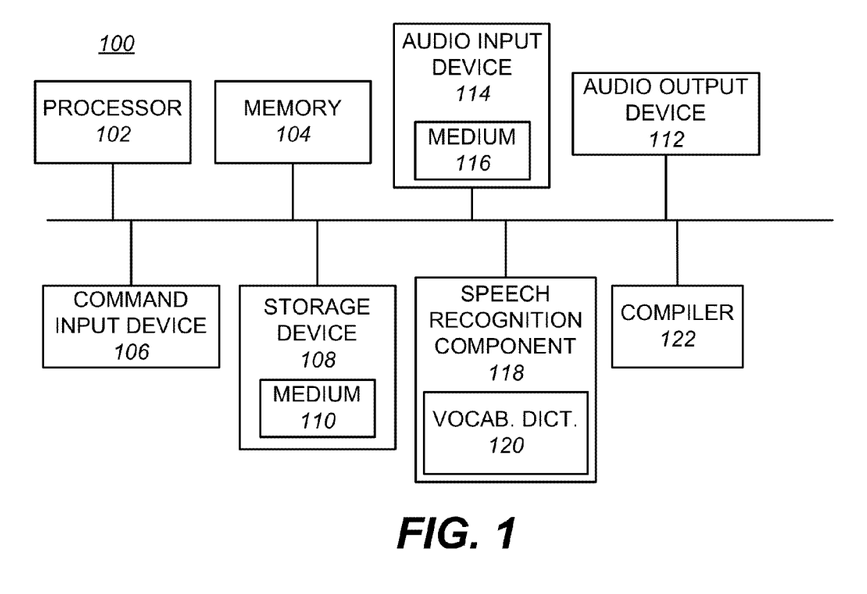
FIG. 1 illustrates a functional block diagram of an embodiment of an in-vehicle audio system.

FIG. 1 is a functional block diagram of an exemplary embodiment of an in-vehicle audio system 100. In-vehicle audio system 100 may include a processor 102, a memory 104, a command input device 106, a storage device 108, an audio output device 112, an audio input device 114, a speech recognition component 118, and a compiler 122.

Processor 102 may include one or more conventional processors that interpret and execute instructions stored in a medium, such as memory 104, a media card, a flash RAM, or other medium. A tangible storage medium may include a memory, a media card, a flash card, or other storage medium. Memory 104 may include random access memory (RAM) or another type of dynamic storage device, and read-only memory (ROM) or another type of static storage device, for storing information and instructions for execution by processor 102. RAM, or another type of dynamic storage device, may store instructions as well as temporary variables or other intermediate information used during execution of instructions by processor 102. ROM, or another type of static storage device, may store static information and instructions for processor 102.

Command input device 106 may include a microphone for speech input, one or more hard or soft buttons, a keyboard, a touchscreen, or other input device.

Storage device 108 may include a medium 110 for storing audio content, such as, for example, music or other audio content. In one embodiment, storage device 108 may be a hard disk drive and medium 110 may be a hard disk.

Audio output device 112 may include one or more speakers, a headset, or other sound reproducing device for outputting audio content.

Audio input device 114 permits audio content to be input to in-vehicle audio system 100. When operational, audio input device 114 may include a medium 116 that stores a representation of audio content. In one embodiment, audio input device 114 may include an optical medium reader such as, for example, a compact disc (CD) reader or a digital video disc (DVD) reader, and medium 116 may be a CD or a DVD, respectively.

Speech recognition component 118 may recognize speech input and may convert the recognized speech input to text. Speech recognition component 118 may include a vocabulary dictionary 120. Vocabulary dictionary 120 may include phonetics corresponding to commands and words or phrases. Each of the words or phrases may be associated with audio content. For example, when an item of audio content is music, a corresponding word or phrase, associated therewith, may be a title of the item of audio content. In some embodiments, speech recognition component 118 may include one or more software modules to be executed by processor 102.

Compiler 122 may compile at least a portion of vocabulary dictionary 120 in order to add or delete phonetics corresponding to a word or a phrase associated with audio content added to in-vehicle audio system 100 or audio content deleted from in-vehicle audio system 100, respectively.

Figure 2:
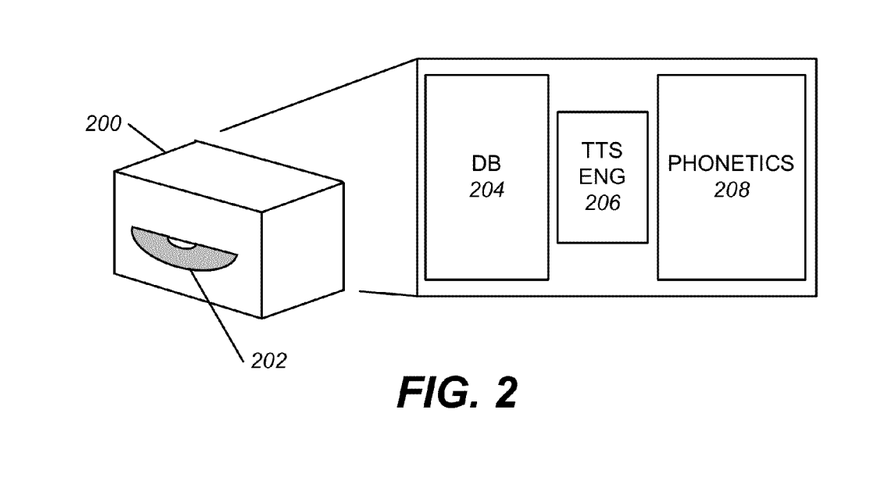
FIG. 2 illustrates, in more detail, an embodiment of an audio input device shown in FIG. 1.

FIG. 2 illustrates an exemplary embodiment 200 of audio input device 114. Embodiment 200 may receive a medium 202 that includes audio content stored therein. Embodiment 200 may read audio content from medium 202, may access a database 204 to determine a word or a phrase associated with each item of the audio content to be added to in-vehicle audio system 100, and may convert the word or the phrase to phonetics 208 via a text-to-speech (TTS) engine 206 or other means. Phonetics 208 may be provided as input to compiler 122 when compiling vocabulary dictionary 120 to add phonetics 208 corresponding to one or more words or one or more phrases associated with one or more items of audio content.

Although, FIG. 2 shows database 204 and TTS engine 206 as being included within embodiment 200 of audio input device 114 to produce phonetics 208, in other embodiments database 204 and TTS engine 206 may not be included within audio input device 114. Instead, database 204 and TTS engine 206 may be included as components of in-vehicle audio system 100. TTS engine 206 may include one or more software modules having instructions to be executed by a processor, such as, for example, processor 102.

Figure 3:
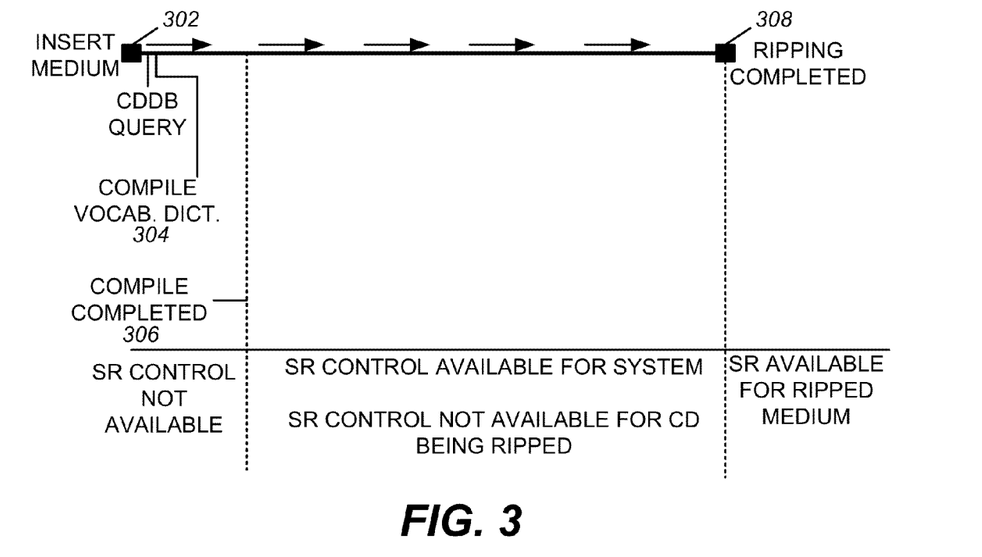
FIG. 3 illustrates an exemplary timeline for copying audio content from a medium to an in-vehicle audio system.

FIG. 3 illustrates an exemplary timeline for ripping audio content from a medium to in-vehicle audio system 100. The medium may include an optical medium such as, for example, a CD or a DVD, or other type of medium. The medium may be mounted on or inserted into audio input device 114 (302). Audio input device 114 may read audio content and then a word or a phrase associated with each item of the audio content to be added to in-vehicle audio system 100 may be determined. The word or the phrase associated with each item of audio content may be stored on the medium or may be determined by in-vehicle audio system 100 or audio input device 114 by "fingerprinting" the medium and performing a database query.

As an example of fingerprinting, suppose that the medium is a CD and the audio content stored thereon includes items of music. Fingerprinting the CD may result in a determination that the CD has N items of music stored thereon with item 1 having a length of $I_1$ followed by a pause of a length $J_1$, item 2 having a length of $I_2$ followed by a pause of a length $J_2$, etc. After the fingerprinting, a database query may provide a fingerprint match for the CD (i.e., a database match for a CD with item 1 having a length of $I_1$ followed by a pause of a length $J_1$, item 2 having a length of $I_2$ followed by a pause of a length $J_2$, etc.). As a result of being provided the fingerprint match, information regarding contents of the CD may be provided, such as a respective word or a respective phrase associated with each item of music stored on the CD. Each of the respective words or the respective phrases may be a respective title of each of the items of music.

A TTS engine may be used to produce phonetics corresponding to the respective word or the respective phrase associated with each of the items of music. The phonetics may be provided as input to compiler 122 when compiling vocabulary dictionary 120 (304). Eventually, compiler 122 completes compiling vocabulary dictionary 120 (306).

During a time in which vocabulary dictionary 120 is being compiled, speech recognition may be unavailable. Otherwise, while the items of music are being ripped, speech recognition may be available for in-vehicle audio system 100, but may not be available for the items of music being ripped. After ripping is completed (308), speech recognition may again be available for all audio content stored in in-vehicle audio system 100, including recently ripped audio content, such as the items of music.

Although the above example refers to ripping items of music from a CD, in other embodiments, items of audio content, which may or may not include music, may be ripped from another type of medium, which may be fingerprinted and matched as described above.

In a variation of the embodiment described with respect to FIG. 3, instead of ripping all audio content stored on a medium, items of audio content may be selectively ripped from the medium. For example, a user may provide a command via command input device 106 to rip only items 1, 5 and 7 from the medium. In such an embodiment, a respective word or a respective phrase associated with each of the items to be ripped may be determined and corresponding phonetics may be produced to be used as input to compiler 122.

Figure 4:
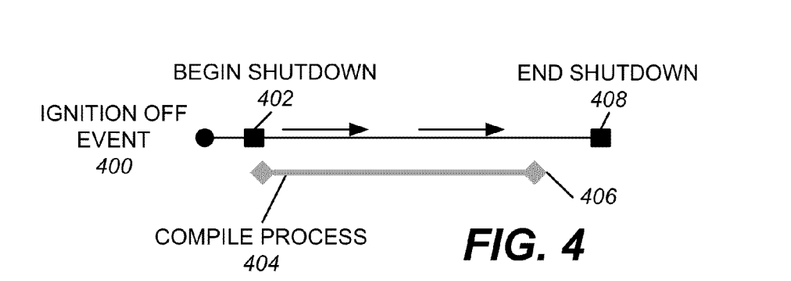
FIGS. 4 and 5 illustrate exemplary timelines for compiling a vocabulary dictionary in response to receiving a command to delete audio content in different embodiments of an in-vehicle audio system.

FIG. 4 illustrates exemplary timing with respect to deleting items of audio content from an embodiment of in-vehicle audio system 100. A user may indicate a desire to delete items of audio content via command input device 106. The user may provide the indication verbally, via a keyboard, via a touch screen, or via other input means. For example, if the indication is provided verbally, the user may utter "delete <word> or <phrase>", where <word> or <phrase> may be a word or a phrase associated with the item of audio content to be deleted.

In some embodiments, compiling vocabulary dictionary 120 may take a substantial amount of time, during which a speech recognition feature of in-vehicle audio system 100 may be unavailable. FIG. 4 illustrates an exemplary timing with respect to compiling vocabulary dictionary 120 in response to deletion of one or more items of audio content from in-vehicle audio system 120.

After receiving a command to delete one or more items of audio content, phonetics corresponding to the one or more items of audio content may be provided to compiler 122 and vocabulary dictionary 120 may be compiled during a shutdown process, with the phonetics provided as input to compiler 122 (404). The shutdown process may begin (402) after detecting an occurrence of an event such as, for example, an ignition off event (i.e., turning off an ignition of a vehicle that includes in-vehicle audio system 100) (400). Compile process 404 may be completed (406) before an end of the shutdown process (408).

In another embodiment, compiler 122 may compile only part of vocabulary dictionary 120, thereby shortening a duration of a compilation process of compiler 122. In such an embodiment, phonetics of vocabulary dictionary 120 may be organized in a specific manner. For example, the phonetics may be organized in alphabetical order (with respect to corresponding words or phrases associated with items of audio content), may be organized by category such as genre or other types of categories, or may be organized in a different manner. Vocabulary dictionary 120 may include a number of portions. As an example, if vocabulary dictionary 120 is organized alphabetically, then a first portion may include phonetics corresponding to words and phrases beginning with letters "a" through "d", a second portion may include phonetics corresponding to words and phrases beginning with letters "e" through "h", etc. In this embodiment, only those portions of vocabulary dictionary 120 that are changing may be compiled by compiler 122.

Figure 5:
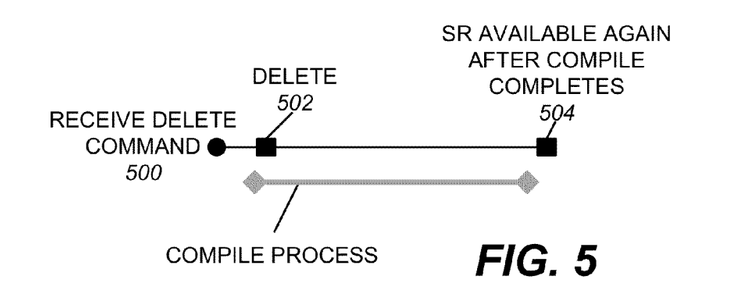

FIG. 5 illustrates exemplary timing of a compile process in the above-mentioned embodiment. First, in-vehicle audio system 100 may receive a delete command (500) to delete one or more items of audio content stored in in-vehicle audio system 100. Shortly thereafter, in-vehicle audio system 100 may delete (502) the one or more items of audio content from medium 110 of storage device 108. Contemporaneously, with respect to deleting the one or more items of audio content, or shortly thereafter or before, compiler 122 may begin to compile one or more portions of vocabulary dictionary 120 corresponding to the one or more items of audio content to be deleted. While performing the compile process, a speech recognition feature of in-vehicle audio system 100 may be unavailable. Upon completion of the compile process, the speech recognition feature may again be available (504).

Exemplary Processes

Figure 6:
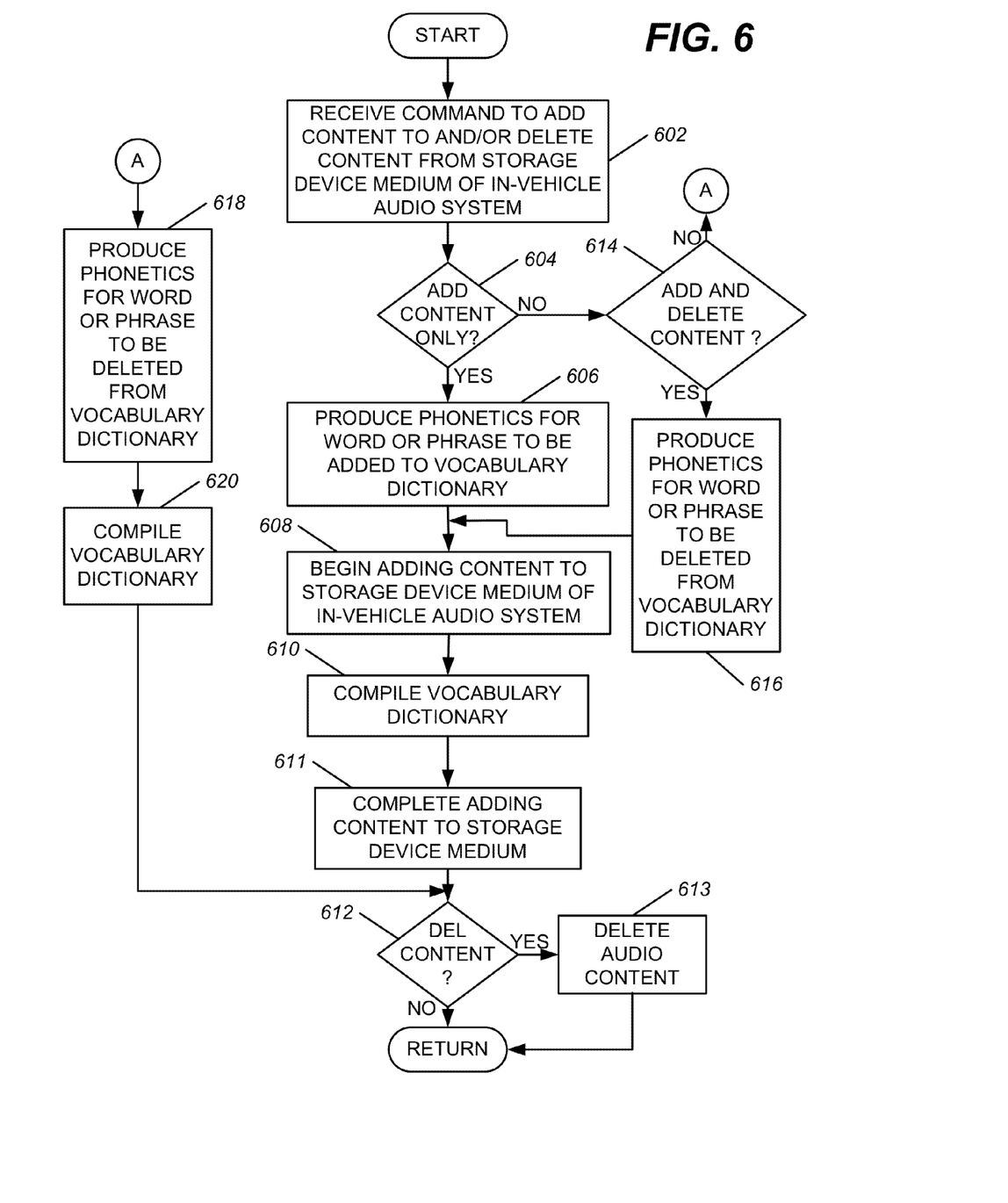
FIGS. 6 and 7 are flowcharts illustrating exemplary processes with respect to adding audio content to and/or deleting audio content from different embodiments of in-vehicle audio system 100.

FIG. 6 is a flowchart of an exemplary process with respect to adding audio content to in-vehicle audio system 100 and/or deleting audio content from in-vehicle audio system 100. The process may begin with in-vehicle audio system 100 receiving a command to add audio content to and/or delete audio content from medium 110 of storage device 108 of in-vehicle audio system 100 (act 602). In-vehicle audio system 100 may then determine whether the received command includes only a command for adding audio content (act 604).

If, during act 604, in-vehicle audio system 100 determines that the received command is a command only for adding audio content, then phonetics for a word or a phrase associated with each item of audio content to be added may be created or produced (act 606). Creating of the phonetics may include: fingerprinting a medium from which items of audio content are to be ripped or copied; finding, in a database, a match for the fingerprinted medium to provide a respective word or a respective phrase associated with each of the items of audio content to be ripped; and generating or producing, via a TTS engine, phonetics corresponding to the respective word or the respective phrase associated with each of the items of audio content to be ripped.

Next, audio content may begin to be added to medium 110 of storage device 108 of in-vehicle audio system 100 (act 608). Compiler 122 may then compile vocabulary dictionary 120 using the produced phonetics as input (act 610). In some embodiments, all of vocabulary dictionary 120 may be compiled and in other embodiments, only one or more portions of vocabulary dictionary 120 may be compiled. In-vehicle audio system 100 may then complete adding the audio content to medium 110 of storage device 108 (act 611). In-vehicle audio system 100 may then determine whether audio content is to be deleted (act 612). If audio content is to be deleted (as a result of receiving a command to delete the audio content from in-vehicle system 100) then in-vehicle audio system 100 may delete the audio content from medium 110 of storage device 108 (act 613). The process may then be completed.

If, during act 604, in-vehicle audio system 100 determines that the received command is not a command only to add audio content, then in-vehicle audio system 100 may determine whether the received command includes commands to add and delete audio content (act 614). If in-vehicle audio system 100 determines that the received command includes the commands to add and delete audio content, then in-vehicle audio system 100 may create or produce phonetics for one or more words or one or more phrases associated with one or more items of audio content to be deleted (act 616). Acts 608-613 may again be performed, as previously discussed. The process may then be completed.

If, during act 614, in-vehicle audio system determines that the received command does not include commands to add and delete audio content, then the received command may be assumed to include only a command to delete audio content. Phonetics for at least one word or at least one phrase associated with one or more items of audio audio content to be deleted may be created or produced (act 618). Compiler 122 may then compile vocabulary dictionary 120 using the produced phonetics as input (act 620). Acts 612-613 may again be performed. The process may then be completed.

The exemplary process illustrated by the flowchart of FIG. 6 is for an embodiment in which audio content may be deleted shortly after receiving a delete audio content command. As previously mentioned, in some embodiments this may be accomplished by compiling only one or more relevant portions of vocabulary dictionary 120 instead of all of vocabulary dictionary 120, as previously discussed.

Figure 7:
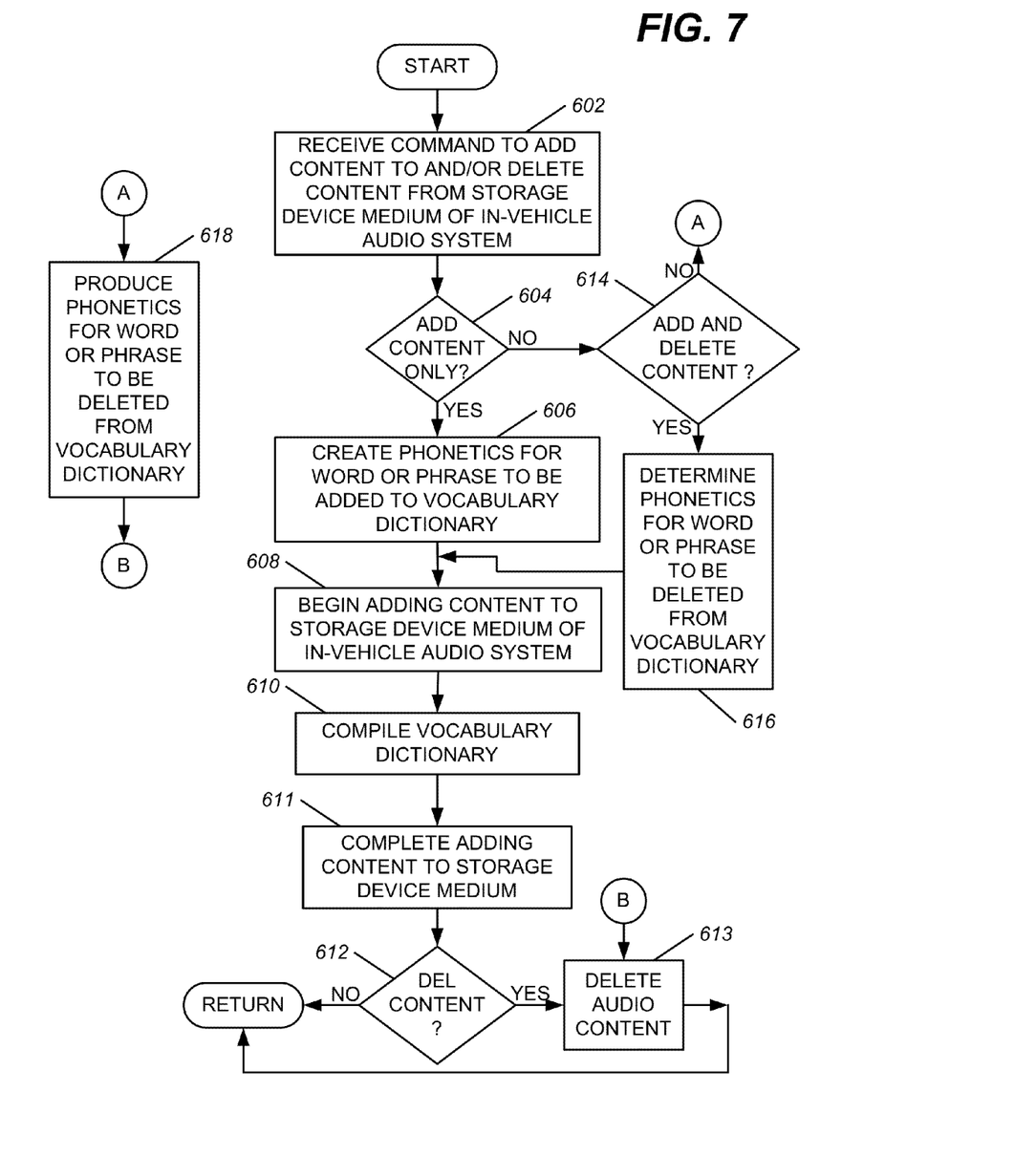

As previously discussed, in some embodiments, all of vocabulary dictionary 120 may be compiled when either adding or deleting audio content with respect to in-vehicle audio system 100. In such embodiments, when deleting audio content, compiler 122 may compile vocabulary dictionary 120 at a time when a user is unlikely to notice unavailability of a speech recognition feature. This may be accomplished by compiling vocabulary dictionary 120 during a shutdown process when audio content is to be deleted from in-vehicle audio system 100. FIG. 7 is an altered version of the flowchart of FIG. 6 for such an embodiment, such that after performing act 618, act 613 is performed and the process is completed without performing acts 620 and 612. However, if the received command includes an add audio content command, with or without a delete audio content command, processing may be performed as originally shown in FIG. 6. That is, if audio content is also being added to in-vehicle audio system 100, vocabulary dictionary 120 may be compiled shortly after detecting receipt of the delete command for deleting audio content.

Figure 8:
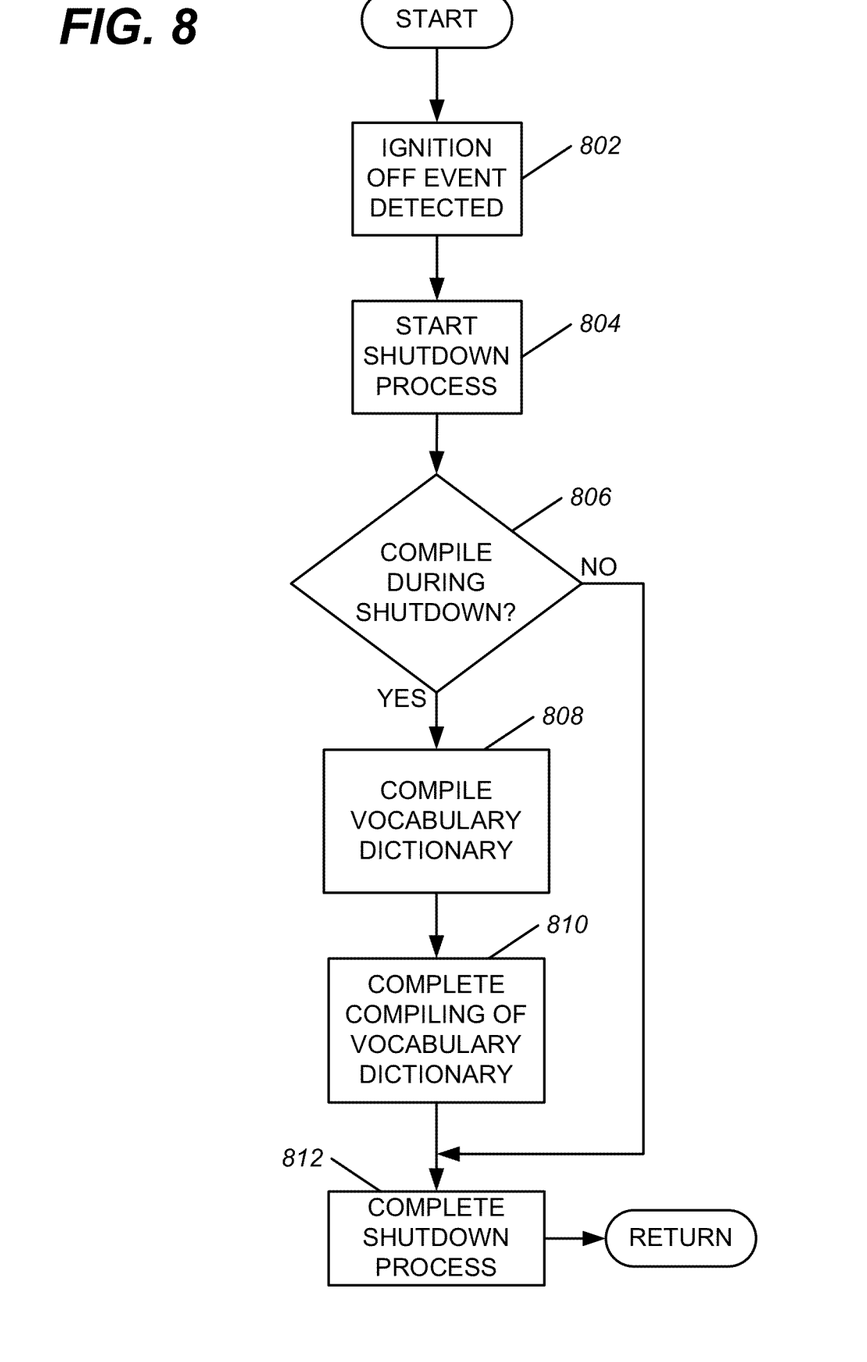
FIG. 8 is a flowchart illustrating exemplary processing for compiling a vocabulary dictionary during a shutdown process in response to receiving a command to delete audio content in an embodiment of an in-vehicle audio system.

FIG. 8 is a flowchart illustrating processing in an embodiment in which, when audio content is to be deleted from and not added to in-vehicle audio system 100, compiler 122 may compile vocabulary dictionary 120 during a shutdown process with respect to a vehicle that includes in-vehicle audio system 100. The process may begin with in-vehicle audio system 100 detecting an ignition off event (at 802). In response to detecting the ignition off event, a shutdown process may be started (act 804).

In-vehicle audio system 100 may then determine whether vocabulary dictionary 120 is to be compiled by compiler 122 during the shutdown process (act 806). Vocabulary dictionary 120 may be compiled during the shutdown process when a delete audio content command was previously received by in-vehicle audio system 100 and vocabulary dictionary 120 has not been compiled since the delete audio content command was received. If in-vehicle audio system 100 determines that vocabulary dictionary 120 is to be compiled, then in-vehicle audio system 100 compiles vocabulary dictionary 120 using previously produced phonetics as input (act 808). The previously produced phonetics may correspond to one or more words or one or more phrases associated with one or more items of audio content to be deleted, or already deleted. Eventually, compiler 122 of in-vehicle audio system 100 completes compiling of vocabulary dictionary 120 (act 810). Sometime after completing the compiling of vocabulary dictionary 120, the shutdown process may be completed (act 812) and the process illustrated by FIG. 8 may be completed.

If, during act 806, in-vehicle audio system 100 determines that compiler 122 is not to compile vocabulary dictionary 120 during the shutdown process, then vocabulary dictionary 120 will not be compiled by compiler 122 during the shutdown process. Eventually, in-vehicle audio system 100 will perform act 812, as previously discussed, and the process illustrated by the flowchart of FIG. 8 may be completed.

Conclusion

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Although the above descriptions may contain specific details, they are not to be construed as limiting the claims in any way. Other configurations of the described embodiments are part of the scope of this disclosure. In addition, acts illustrated by the flowcharts of FIGS. 6-8 may be performed in a different order in other embodiments, and may include additional or fewer acts. For example, in some embodiments, instead of compiling vocabulary dictionary 120 once to add phonetics to and delete phonetics from vocabulary dictionary 120, when an add audio content command and a delete audio content command are received by in-vehicle audio system 100, vocabulary dictionary 120 may be compiled once for each add audio content command received and once for each delete audio content command received. In other embodi-

We claim as our invention:

1. A method, implemented in an in-vehicle audio system, for compiling a vocabulary dictionary for speech recognition, the method comprising:
   receiving a command to add audio content to a storage device of the in-vehicle audio system, each respective item of the audio content having a respective word or a respective phrase associated therewith; and
   compiling the vocabulary dictionary to add phonetics corresponding to the respective word or the respective phrase associated with each respective item of the audio content to be added to the vocabulary dictionary such that, after completion of the compiling, a speech recognition component of the in-vehicle audio system becomes capable of recognizing an utterance including the respective word or the respective phrase associated with any of the each respective item, the compiling being started while the audio content is being added to the storage device and the compiling being completed before the audio content is completely added to the storage device, wherein:
   speech recognition control is available after completion of the compiling the vocabulary dictionary, and
   the speech recognition control related to the each respective item of the audio content becomes available after completion of adding the content to the storage device; and
   the method further comprises:
      receiving a second command to delete from the audio content of the storage device;
      detecting an ignition off event as a result of turning off an ignition of a vehicle including the in-vehicle audio system;
      initiating a shutdown process of the in-vehicle audio system upon the detecting an ignition off event; and
      compiling, during the shutdown process, the vocabulary dictionary to delete, from the vocabulary dictionary, phonetics corresponding to a respective word or a respective phrase associated with at least one item of the audio content to be deleted from the storage device in response to the receiving a second command to delete from the audio content of the storage device.

2. The method of claim 1, wherein when adding a plurality of items of the audio content to the storage device from a medium, the compiling of the vocabulary dictionary completes before the plurality of items of the audio content are completely added to the storage device.

3. The method of claim 1, wherein the compiling, during the shutdown process, the vocabulary dictionary further comprises:
   compiling at least a portion of the vocabulary dictionary to delete, from the vocabulary dictionary, the phonetics corresponding to the respective word or the respective phrase associated with the at least one item of the audio content to be deleted from the storage device.

4. The method of claim 3, wherein:
   the vocabulary dictionary is organized into a plurality of portions, and
   the plurality of portions are arranged according to any one organizing technique selected from a group of organizing techniques consisting of alphabetically by respective words associated with at least one item of the content, alphabetically by respective phrases associated with the at least one item of the content, and by respective genres of the at least one item of the content.

5. The method of claim 1, wherein:
   the audio content includes music and the respective word or the respective phrase associated with the each respective item includes a respective title of an item of the music.

6. An in-vehicle audio system having a speech recognition feature, the in-vehicle audio system comprising:
   a storage device for storing audio content, each item of the audio content having a respective word or a respective phrase associated therewith;
   a microphone for receiving voice input;
   a speech recognition component for recognizing spoken words of the received voice input, the speech recognition component including a vocabulary dictionary for use in recognizing spoken commands in the received voice input; and
   a compiler for compiling the vocabulary dictionary while new audio content is being added to the storage device such that phonetics corresponding to a respective word or a respective phrase associated with each added item of the new audio content is included in the vocabulary dictionary as a result of the compiling, wherein:
   the compiler begins compiling the vocabulary dictionary while the new audio content is being added to the storage device,
   the compiler completes the compiling the vocabulary dictionary before the new audio content is completely added to the storage device,
   the speech recognition component is capable of recognizing the respective word or the respective phrase associated with the each added item of the new audio content after the compiler completes compiling the vocabulary dictionary,
   speech recognition control is available after the compiler completes the compiling the vocabulary dictionary,
   the speech recognition control related to the each added item of the new audio content becomes available after completion of adding the new audio content to the storage device, and
   the compiler is further for compiling the vocabulary dictionary, during a shutdown process, to delete, from the vocabulary dictionary, phonetics corresponding to a respective word or a respective phrase associated with each item of audio content to be deleted from the storage device, the shutdown process having been initiated by detecting an ignition of a vehicle, including the in-vehicle audio system, being turned off.

7. The in-vehicle audio system of claim 6, wherein in response to receiving a command to delete one or more items of audio content from the storage device, the compiler updates the vocabulary dictionary by compiling at least a portion of the vocabulary dictionary.

8. The in-vehicle audio system of claim 7, wherein:
   the vocabulary dictionary is organized into a plurality of portions, and
   the plurality of portions are arranged according to any one organizing technique selected from a group of organizing techniques consisting of alphabetically by respective words associated with at least one audio item of the content, alphabetically by respective phrases associated with the at least one item of the audio content, and by respective genres of the at least one item of the content.

9. The in-vehicle audio system of claim 7, wherein the compiler compiles at least the portion of the vocabulary dictionary during a shutdown process.

10. The in-vehicle audio system of claim 9, wherein:
the shutdown process completes after the compiling completes.

11. The in-vehicle audio system of claim 6, wherein:
the audio content includes items of music, and
the respective word or the respective phrase associated with a respective item of music is a title of the respective item of music.

12. The in-vehicle audio system of claim 6, further comprising:
an optical medium reader for reading the new audio content from an optical medium and for adding the new audio content to the audio content of the storage device.

13. A non-transitory machine-readable storage medium having instructions recorded therein for at least one processor of an in-vehicle audio system, execution of the instructions by the at least one processor causing the in-vehicle audio system to perform a method comprising:
receiving a command to add one or more items of audio content to a medium of a storage device of the in-vehicle audio system, each respective item of the audio content having a word or a phrase associated therewith; and
compiling at least a portion of a vocabulary dictionary of a speech recognition component of the in-vehicle audio system to update the vocabulary dictionary by adding, to the vocabulary dictionary, phonetics corresponding to at least one word or at least one phrase associated with the one or more items of audio content to be added, the vocabulary dictionary being arranged as a plurality of portions, each of the plurality of portions being capable of compiling separately, wherein:
the compiling is started while the one or more items of the audio content are being added to the medium of the storage device,
the compiling is completed before the one or more items of the audio content are completely added to the medium of the storage device,
after completion of the compiling, the speech recognition component is capable of recognizing at least one word or at least one phrase associated with any one or more items of audio content added to the vocabulary dictionary,
speech recognition control is available after the compiler completes compiling the vocabulary dictionary, and
the speech recognition control related to each respective item of the audio content added to the medium of the storage device becomes available after completion of adding the audio content to the medium of the storage device, and
the method further comprises:
receiving a second command to delete at least one item of the audio content from the medium of the storage device;
detecting an ignition off event as a result of turning off an ignition of a vehicle including the in-vehicle audio system;
initiating a shutdown process of the in-vehicle audio system upon the detecting an ignition off event; and
compiling, during the shutdown process, at least a second portion of the vocabulary dictionary to update the vocabulary dictionary by deleting, from the vocabulary dictionary, phonetics corresponding to at least one word or at least one phrase associated with the at least item of the audio content to be deleted.

14. The non-transitory machine-readable storage medium of claim 13, wherein when the received command includes a first command to add one or more items of audio content to the medium of the storage device and a second command to delete one or more items of audio content from the medium of the storage device, the compiling is to be performed while the one or more items of audio content are being added to the medium of the storage device.

15. The non-transitory machine-readable storage medium of claim 13, wherein:
the audio content stored on the medium of the storage device includes music, and
the word or the phrase associated with each respective item of the music is a respective title.

16. The non-transitory machine-readable storage medium of claim 13, wherein the method further comprises:
copying the one or more items of audio content from a second medium to the medium of the storage device.

17. The non-transitory machine-readable storage medium of claim 13, wherein:
the plurality of portions are arranged according to any one organizing technique selected from a group of organizing techniques consisting of alphabetically by respective words associated with at least one item of the audio content, alphabetically by respective phrases associated with the at least one item of the audio content, and by respective genres of the at least one item of the content.

\* \* \* \* \*